May 28, 1968     A. F. HODGES     3,385,538

AIRCRAFT

Filed May 23, 1966

INVENTOR.
ALGERNON F. HODGES

BY

ATTORNEY

United States Patent Office 3,385,538
Patented May 28, 1968

3,385,538
AIRCRAFT
Algernon F. Hodges, San Marino, Calif.
(1181 S. Oak Knoll Ave., Pasadena, Calif. 91106)
Filed May 23, 1966, Ser. No. 551,981
6 Claims. (Cl. 244—13)

ABSTRACT OF THE DISCLOSURE

An aircraft suitable for supersonic flight in which a plurality of wings project substantially horizontally from each side of the fuselage and are substantially longer along the longitudinal axis of the fuselage than in the direction transverse thereto so as to provide a minimum profile in all directions yet a relatively large wing surface for efficient lift and control.

---

This invention relates generally to aircraft and, more specifically, to supersonic aircraft having a minimum profile in all directions.

It is well known that aircraft configuration requirements for efficient supersonic flight are not compatible with configuration requirements for efficient low speed flight, take-off and climb, or descent and landing. The optimum wing configuration for low speed flight and conventional take-off and landing is considered to require a long span, narrow chord wing having a low sweep angle. However, such a wing configuration is undesirable for supersonic flight due to the high aerodynamic drag of wings. Also, the conventional long span, narrow chord wing is undesirable for aircraft utilized over hostile territory where the large profile of the aircraft makes it more vulnerable to attack by enemy aircraft or anti-aircraft fire and also to radar detection.

What is needed, therefore, is an aircraft that has sufficient wing surface to provide the necessary lift for efficient low speed flight, take-off and climb, or descent and landing, yet has a minimum profile and minimum aerodynamic drag for efficient supersonic flight.

It is, therefore, the principal object of this invention to provide an improved aircraft.

Another object of the invention is to provide an aircraft which has a minimum profile in all directions and is efficient for supersonic flight.

According to the principal aspect of the present invention, there is provided an aircraft having a conventional fuselage including a plurality of wings projecting substantially horizontally from the sides of the fuselage and stabilizer and rudder elements mounted thereon. The wings, stabilizer and rudder elements on the fuselage each are substantially longer along the longitudinal axis of the fuselage than in the direction transverse thereto, thus providing an aircraft which has a minimum profile in all directions and a relatively large wing surface for lift and control of the aircraft. Yet, the wing surface does not extend a substantial length transverse of the fuselage, as in conventional aircraft, so as to render the aircraft inefficient for supersonic flight.

Other objects, aspects and advantages of the invention will become more apparent from the following description taken in connection with the accompanying drawing wherein.

Figure 1:
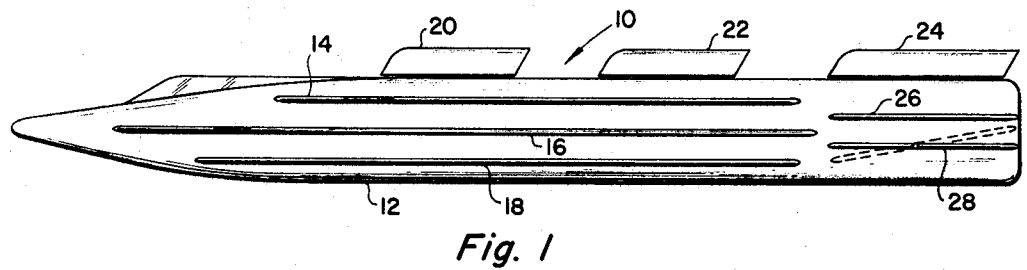
FIG. 1 is an elevational view of an aircraft incorporating the novel features of the present invention.

Referring now to the drawing in detail, wherein like reference characters designate like or corresponding parts throughout the several views, there is shown an aircraft 10 provided with a conventional fuselage 12 of a type having a reaction propulsion motor mounted therein. However, it is understood that the aircraft could be powered by a motor-driven propeller, if desired. A plurality of wings 14, 16 and 18 are connected to each side of the fuselage and project substantially horizontally therefrom. As shown in the drawing, the wings are spaced in a vertical direction a substantially equal distance apart and extend substantially the full length of the fuselage. However, in contrast to conventional wings for aircraft, the wings 14, 16 and 18 extend only a relatively short distance in a horizontal direction from the fuselage so as to provide a low profile aircraft. Yet, because more than one wing is provided on each side of the fuselage, there is substantial wing surface to effect the necessary lift for the aircraft for relatively efficient take-off, low speed flight and descent or landing. Also, because the wings are relatively short in a lateral direction from the fuselage, the aerodynamic drag of the aircraft is less than that encountered by aircraft having the conventional long span, narrow wing with a low sweep angle. An additional advantage of having wings which extend only a short distance in a lateral direction is that they are much easier to mount to the fuselage of the aircraft and are not subject to the structural strains which result with conventional aircraft in supersonic flight. Although three wings 14, 16 and 18 have been illustrated in the drawing, it should be understood that two or any additional number of wings could be provided in accordance with the present invention.

Figure 2:
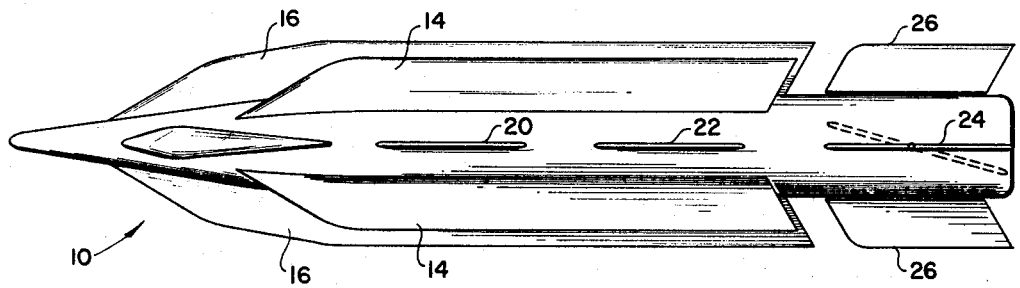
FIG. 2 is a plan view of the aircraft of FIG. 1.

Another important feature of the invention is the provision of a plurality of rudder elements 20, 22 and 24 which project substantially vertically from the top of the fuselage 12. Each of the rudder elements is in the form of air foil sections of the conventional type. Each of the rudder elements is mounted to rotate about an axis extending substantially vertically from the fuselage to provide aircraft yaw control. For example, as seen in FIG. 2, the rearwardmost rudder 24 is shown in phantom lines in an angular position for yaw control of the aircraft. Since a plurality of such rudder elements are provided, it can be readily appreciated that the aircraft of the present invention will be highly maneuverable due to the large surface of the rudder elements which are available for control of the aircraft.

The present invention further contemplates a plurality of stabilizer elements 26 and 28 mounted on the sides of the fuselage 12. Each of the stabilizer elements is mounted for rotation about an axis extending substantially horizontally from the fuselage. As seen in FIG. 1, the stabilizer element 28 is shown in phantom lines in an angular position for controlling the roll or pitch of the aircraft. Although two pairs of the rudder elements 26 and 28 have been shown in the drawing, it should be understood that more than two could be provided on the fuselage of the aircraft of the invention if desired.

Figure 4:
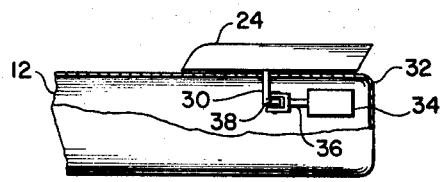
FIG. 4 is a vertical sectional view of the upper, rear portion of the aircraft of FIG. 1 showing the actuator for the rudder thereon.
Figure 3:
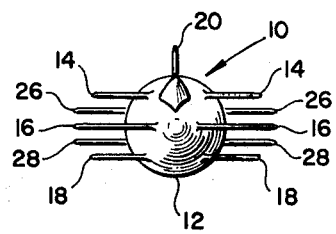
FIG. 3 is a front elevational view of the aircraft of FIGS. 1 and 2.
Figure 5:
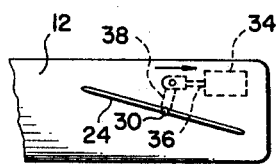
FIG. 5 is a plan view of the rudder and fuselage of FIG. 4 showing the rudder shifted at an angle, with the actuator therefor being shown in phantom lines.

Referring now to FIGS. 4 and 5, there is illustrated an actuating means for controlling the position of the rudder element 24 in FIG. 1, it being understood that the actuating means for the other rudder elements and stabilizer elements could be the same as that shown in FIGS. 4 and 5 for the rudder element 24. Preferably, the rudder element 24 is mounted on a shaft 30 journaled in an opening in the wall 32 of the fuselage 12. An actuator 34 is suitably mounted within the fuselage and has a longitudinally movable shaft 36 connected to a crank 38 at the inner end of the shaft 30. The actuator 34 may be a hydraulic motor, solenoid, or any other form of conventional actuator. Upon actuation of the actuator 34, the shaft 36 moves in a longitudinal direction, as seen by the arrow in FIG. 5 for example, effecting clockwise rotation of the shaft 30 and therefore deflecting the rudder element 24. Movement of the shaft in the opposite direction would effect counterclockwise rotation of the shaft and rudder element 24. It is understood that it is not an object of the present invention to provide any specific mechanism for rotating and deflecting the rudder and stabilizer elements. The mechanism disclosed in FIGS. 4 and 5 is shown for purposes of example only. Also, it is understood that any suitable control system (not shown) may be utilized for operating the actuator 34 so that the stabilizer or rudder elements may be operated, respectively, in unison or separately. For example, with a suitable control system one might effect deflection of the rudder elements 22 and 24 and stabilizers 26 and 28 on only one side of the aircraft while leaving the other rudder element 20 and stabilizer elements 26 and 28 on the opposite side of the aircraft stationary for effecting a turn and dive of the aircraft.

Although the wings 14, 16 and 18 and stabilizer and rudder elements are shown as having the same width, it should be understood that the configuration of these elements on the aircraft of the invention is not limited to that illustrated in the drawing. For example, the wings 14, 16 and 18 could be wider than the rudders and stabilizers, but preferably they should be no wider than the width of the fuselage itself in order to maintain the advantageous feature of the invention that the aircraft have a minimum profile and, therefore, be less vulnerable to radar detection and enemy attack than conventional aircraft.

Although only one embodiment of the invention has been disclosed herein for purposes of illustration, it will be understood that various changes can be made in the form, details, arrangement and proportions for the various parts within the limitations of the description above without departing from the spirit and scope of the invention as defined by the appended claims.

I claim:
1. An aircraft comprising:
 a fuselage carrying propulsion means therefor;
 a plurality of wings connected to each side of said fuselage and projecting substantially horizontally therefrom;
 at least one stabilizer element projecting substantially horizontally from each side of the rear of said fuselage;
 at least one rudder element projecting substantially vertically from the top of said fuselage; and
 said wings, stabilizer elements and rudder elements each being substantially longer along the longitudinal axis of said fuselage than in the direction transverse to said fuselage, with said wings extending substantially the full length of said fuselage and having generally parallel outer edges.

2. An aircraft as set forth in claim 1 wherein there is provided a plurality of said stabilizer elements on each side of said fuselage; and
 means pivotally mounting each of said stabilizer elements to said fuselage for rotation about an axis extending substantially horizontally from said fuselage.

3. An aircraft as set forth in claim 1 wherein there is provided a plurality of said rudder elements spaced longitudinally along the top of said fuselage; and
 means pivotally mounting each of said rudder elements to said fuselage for rotation about an axis extending substantially vertically from said fuselage.

4. An aircraft as set forth in claim 3 wherein there is provided a plurality of said stabilizer elements on each side of said fuselage; and
 means pivotally mounting each of said stabilizer elements to said fuselage for rotation about an axis extending substantially horizontally from said fuselage.

5. An aircraft as set forth in claim 4 wherein each of said pivotally mounting means are located substantially intermediate the ends of said stabilizer elements and rudder elements, respectively.

6. An aircraft as set forth in claim 1 wherein the width of each of said wings, stabilizer elements and rudder elements is no greater than the width of said fuselage.

References Cited

UNITED STATES PATENTS

| | | | |
|---|---|---|---|
| 1,318,791 | 10/1919 | Nelson | 244—45 |
| 1,376,675 | 5/1921 | Caspar | 244—13 |
| 2,020,616 | 11/1935 | Molicki | 244—45 |
| 2,357,200 | 8/1944 | Hollingsworth | 244—13 |
| 3,284,028 | 11/1966 | Robertson | 244—35 |

MILTON BUCHLER, *Primary Examiner.*

FERGUS S. MIDDLETON, *Examiner.*

T. W. BUCKMAN, *Assistant Examiner.*